Jan. 18, 1966   J. B. KUCERA   3,229,827
MATERIAL HANDLING APPARATUS
Filed July 16, 1963   5 Sheets-Sheet 1

INVENTOR
JOSEPH B. KUCERA
BY
ATTORNEY

Jan. 18, 1966  J. B. KUCERA  3,229,827
MATERIAL HANDLING APPARATUS
Filed July 16, 1963  5 Sheets-Sheet 2
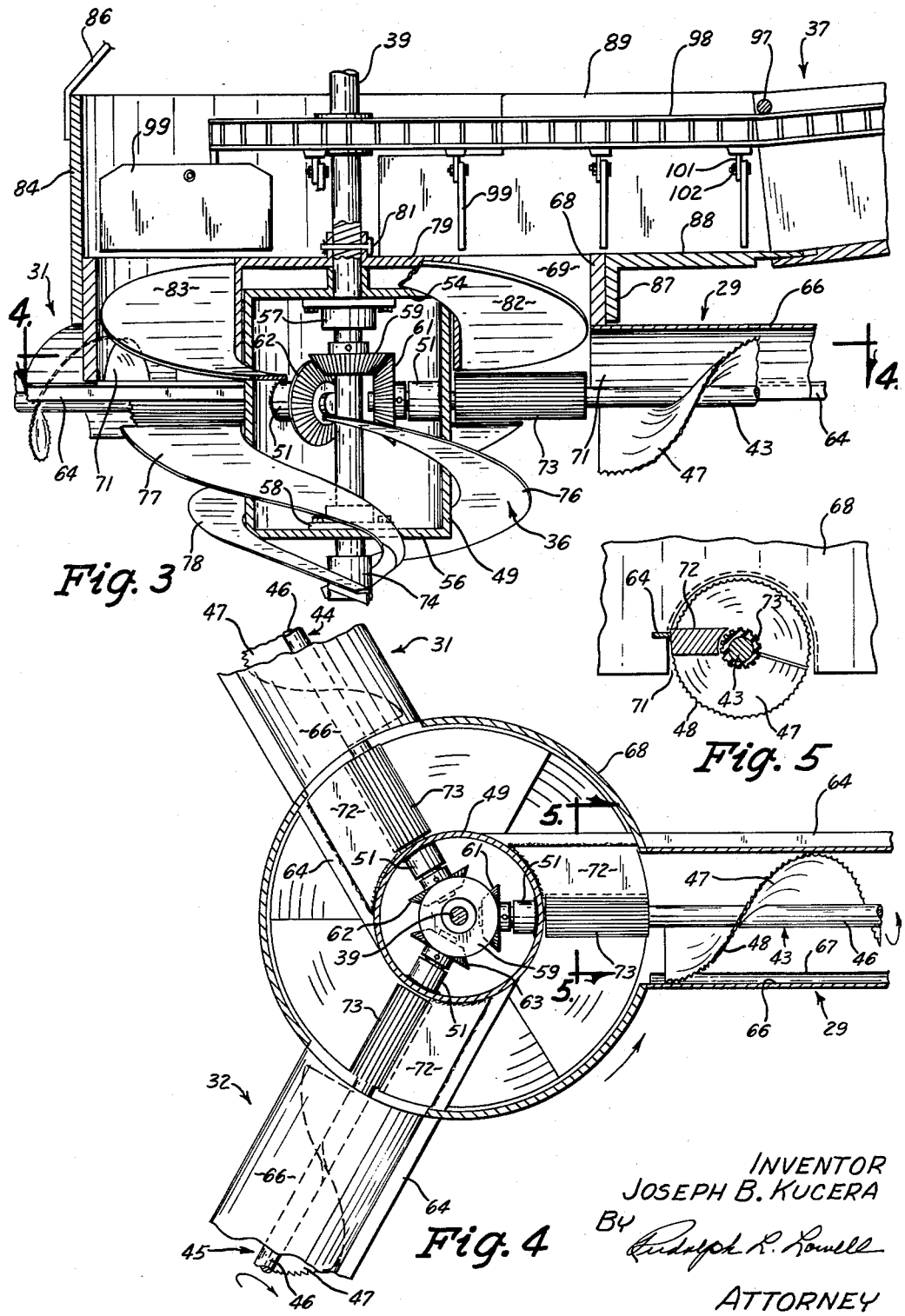
INVENTOR
JOSEPH B. KUCERA
BY
ATTORNEY Jan. 18, 1966     J. B. KUCERA     3,229,827
MATERIAL HANDLING APPARATUS
Filed July 16, 1963     5 Sheets-Sheet 3

INVENTOR
JOSEPH B. KUCERA
BY
ATTORNEY

Jan. 18, 1966   J. B. KUCERA   3,229,827
MATERIAL HANDLING APPARATUS
Filed July 16, 1963   5 Sheets-Sheet 4
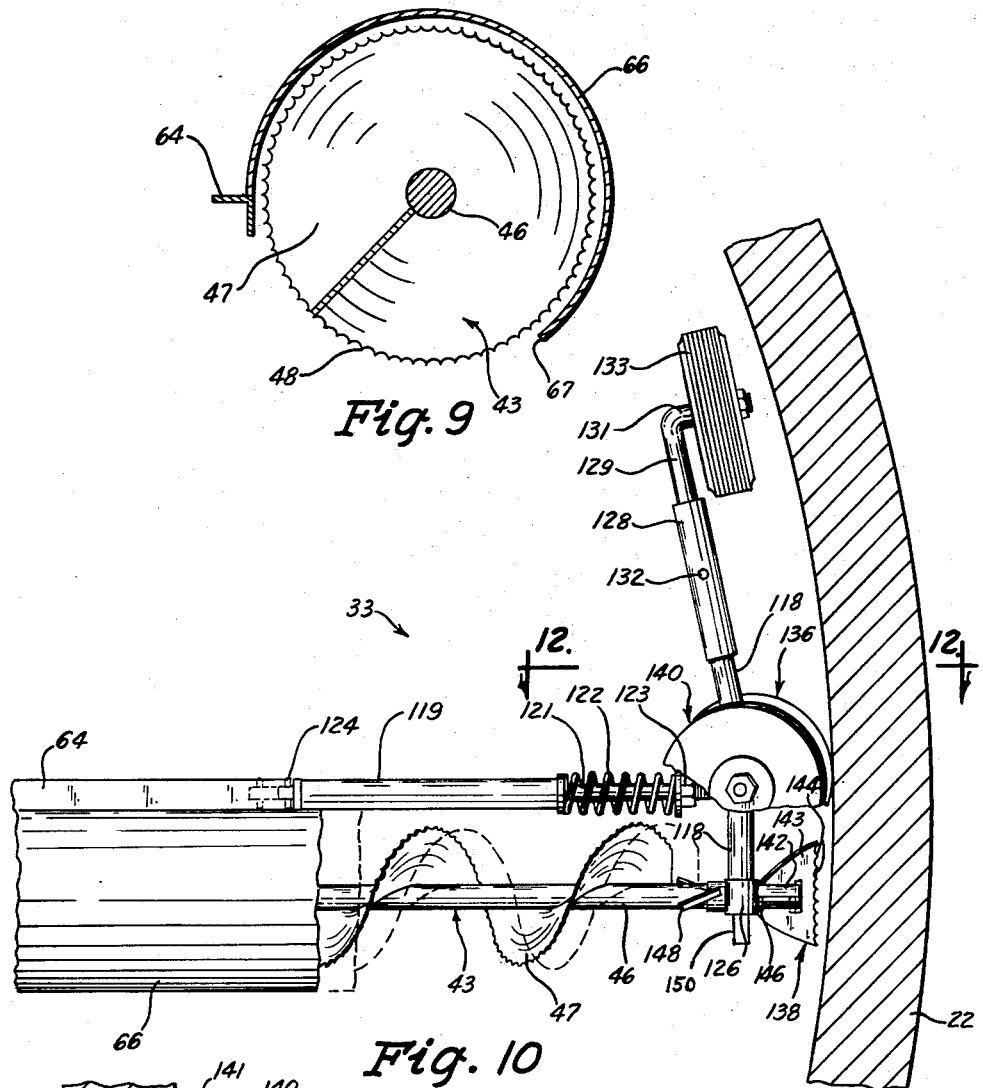
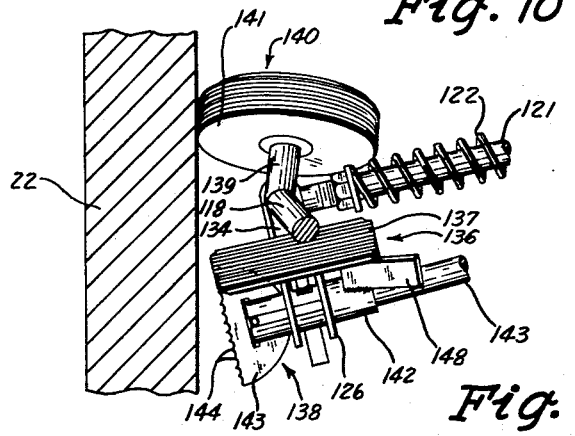
INVENTOR
JOSEPH B. KUCERA
BY
ATTORNEY Jan. 18, 1966  J. B. KUCERA  3,229,827
MATERIAL HANDLING APPARATUS
Filed July 16, 1963  5 Sheets-Sheet 5

INVENTOR
JOSEPH B. KUCERA
BY
ATTORNEY

United States Patent Office 3,229,827
Patented Jan. 18, 1966

3,229,827
MATERIAL HANDLING APPARATUS
Joseph B. Kucera, Traer, Iowa, assignor of fifty percent to Rudolph L. Lowell, Des Moines, Iowa
Filed July 16, 1963, Ser. No. 295,420
5 Claims. (Cl. 214—17)

This invention relates to a material gathering and conveying apparatus and more particularly to a silo unloader which operates to remove bulk material stored in a silo.

It is the object of the invention to provide an improved silo unloader having a silage collector which conjointly moves silage toward the center area of the silo and walks around the silo, and a lateral conveyer which carries silage from the center area of the silo to a silage discharge chute.

Another object of the invention is to provide a silo unloader with a wheel assembly which operates to automatically maintain corresponding portions of a plurality of silage collectors in relative level positions and to lower the silo unloader in accordance with the level of the silage in the silo without the use of a suspension cable.

A further object is to provide a silo unloader which has low power requirements and is self-cleaning during operation.

Another object of the invention is to provide in a silo unloader having silage collectors, a wheel assembly which is automatically adjustable to maintain a uniform working depth of the silage collectors and is adjustable to vary the working depth of the silage collectors.

An additional object of the invention is to provide a reliable and economical silo unloader which is sturdy in construction and readily accessible for repair and servicing.

Other objects and advantages of the material handling apparatus of the invention will be apparent from the following detailed description taken in conjunction with the drawing in which:

FIG. 3 is an enlarged vertical sectional view of the center section of the silage unloader of FIG. 1;

FIG. 4 is a sectional view taken along the line 4—4 of FIG. 3;

FIG. 5 is a sectional view taken along the line 5—5 of FIG. 4;

FIG. 9 is an enlarged sectional view taken along the line 9—9 of FIG. 2;

FIG. 10 is an enlarged plan view of the chipper and wheel assembly on the outer end of the silage collectors;

FIG. 13 is a view similar to FIG. 12 showing the wheel assembly in a position for leveling the silo unloader.

Figures 1, 2:
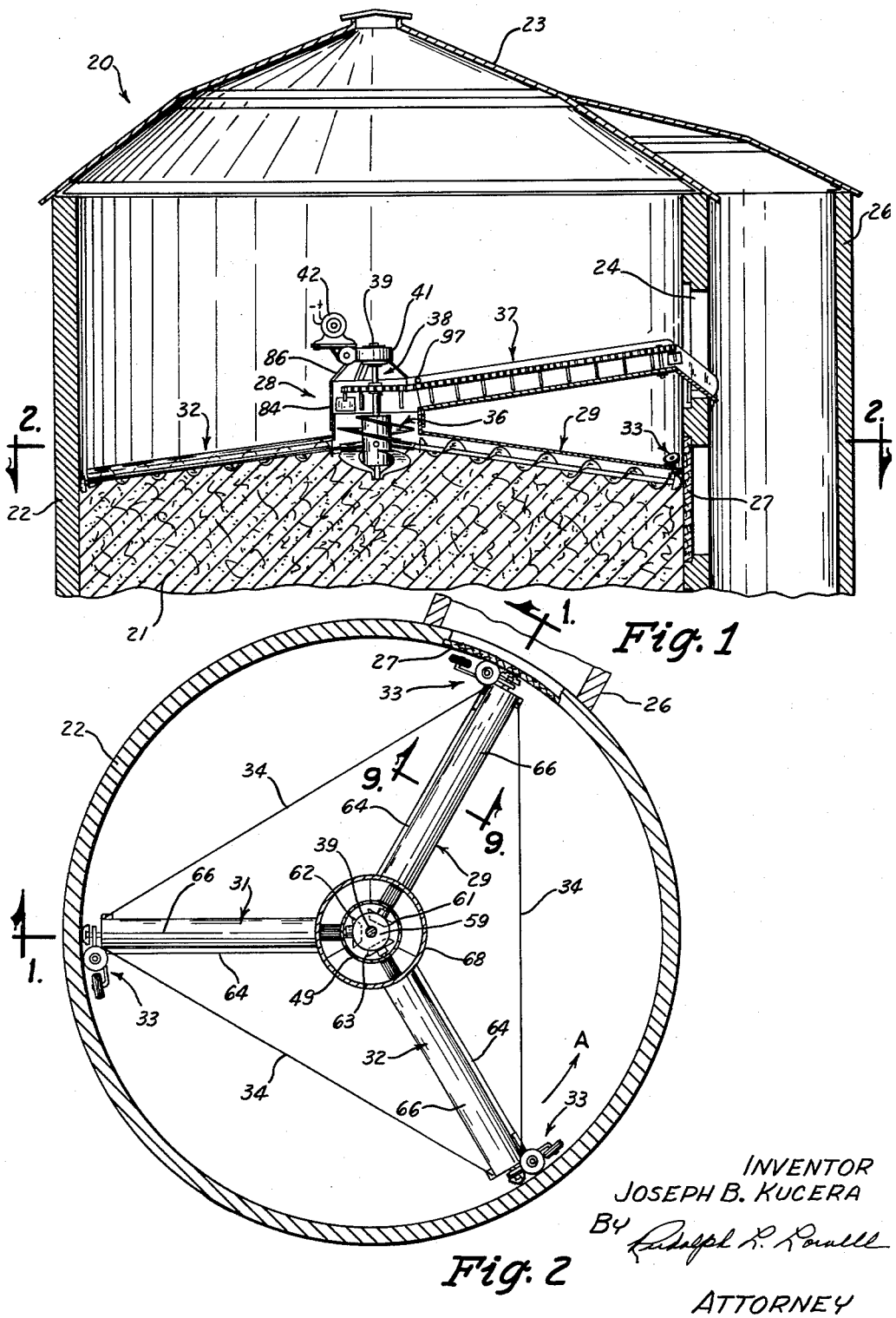
FIG. 1 is a vertical sectional view taken along the line 1—1 of FIG. 2 showing the silage unloader of the invention in operative relation with the silage stored in the silo.
FIG. 2 is an enlarged sectional view taken along the line 2—2 of FIG. 1.

Referring to the drawing, there is shown in FIG. 1 an upright silo 20 partially filled with silage 21 such as cut grasses or corn. The silo 20 is a conventional structure of a cylindrical shape having a circular side wall 22 and a roof unit 23 supported on the top of the side wall 22. Vertically aligned openings or doorways 24 in the side wall 22 open into an upright silage discharge chute 26. In order to retain the silage 21 in the silo, removable doors 27 are positioned in the doorways 24. As the level of the silage is lowered the doors 27 are removed from the doorway above the surface of the silage thereby providing an access opening through which the silage may be discharged to the chute 26.

The silage 21 is automatically removed from the silo 20 by a silo unloader 28 which is positioned on the top of the silage and operates to collect and convey the top layer of silage to the center area of the silo. From the central area of the silo the unloader 28 conveys the silage through the doorway 24 into the discharge chute 26.

As shown in FIG. 2, the silo unloader 28 has three radially extended silage collector units 29, 31 and 32 which are equally spaced from each other and extend outwardly and downwardly from the central area of the silo to the side wall 22. Each unit has mounted on its outer end a wheel assembly 33 which operates to automatically maintain the unloader 28 in a substantially level position and to lower the loader in accordance with the level of the silage in the silo. In the level or operating position each silage collector unit 29, 31 and 32 is in engagement with the top surface of the stored silage along its entire axial length and extends radially outward at a slight downward angle. The wheel assemblies 33 are in engagement with the inner periphery of the side wall 22. Each wheel assembly maintains a corresponding collector unit a predetermined distance from the side wall.

In order to reduce the bending forces on each of the collector units 29, 31 and 32, a cable 34 is connected to the outer ends of adjacent units so as to circumferentially connect the units. The collector units 29, 31 and 32 move or walk around the silo in the direction of the arrow A shown in FIG. 2 and during such walking movement act to move the top layer of silage toward the center area of the silo so as to leave the top portion of the stored silage in a cone shape.

An upright auger assembly 36 receives the silage from the discharge ends of the collector units 29, 31 and 32 and moves the silage in an upward direction to a lateral conveyer 37 which carries the silage from the center area of the silo through the doorway 24 for discharge into the chute 26.

The collector units 29, 31 and 32, the upright auger assembly 36, and the lateral conveyor 37 are operated by a power transmitting assembly 38 which includes an upright drive shaft 39 that provides a positive drive connection between the respective collector units, the auger assembly 36 and lateral conveyor 37. The drive shaft 39 is rotated by a worm and worm gear assembly 41 mounted on the upper end of the shaft and driven by an electric motor 42 mounted on the worm gear assembly 41. The electric motor 42 is connected to a power supply by a manually operated switch (not shown) which is conveniently located at the base of the silo.

As shown in FIG. 4, the collector units 29, 31 and 32 have augers 43, 44 and 45, respectively, which are in engagement with the silage 21. Each auger has an axial shaft to which is secured a continuous helical flight 47 having a serrated peripheral edge 48. The inner ends of the shafts 46 for the augers 43, 44 and 45 extend into a cylindrical casing 49 and are rotatably mounted by bearings 51 secured to the inside wall of the casing 49.

As shown in FIG. 3, the drive shaft 39 extends through the top end wall 54 and bottom end wall 56 of the casing 49 and is rotatably mounted on such end walls by bearings 57 and 58 which are secured to the inside surfaces of their respective walls. A bevel drive gear 59 is secured to the portion of the shaft in the casing 49 and engages driven bevel gears 61, 62 and 63 mounted on the inner ends of the shafts 46 of the augers 43, 44 and 45. The drive shaft 39 rotates the bevel gear 59 which is in engagement with the top portions of the bevel gears 61, 62 and 63 whereby to rotate the shafts 46 of the respective augers 43, 44 and 45 in the direction of movement of the collector units around the silo. In addition to rotating the augers of the collector units the bevel drive gear 59 coacts with the driven bevel gears 61, 62 and 63 to produce a torque which rotates the casing 49 in the direction of the arrow A shown in FIG. 2 to move or walk the collector units 29, 31 and 32 around the silo wall 22.

As shown in FIGS. 2 and 3, each collector unit 29, 31 and 32 has a radially extended angle beam 64 which is positioned adjacent the forward section of the helical flight 47 and is secured at its inner end to the casing 49. As shown in FIG. 9, an angle beam 64 lies parallel to a corresponding auger shaft 46 in substantially the longitudinal plane of the shaft 46. The outer end of the angle beam 64 terminates adjacent the wheel assembly 33. An arcuate cover or sheath 66 secured to the angle beam 64 extends over the top and back sections of the auger flight 47 and terminates in a longitudinally extended edge 67 adjacent the rear portion of the bottom section of the auger flight 47.

The inner end of each cover 66 is secured to an upright cylindrical shell 68 which is positioned concentrically about the casing 49. The shell 68 has a diameter larger than the diameter of the casing 49 so as to provide a throat area 69 into which is disposed the upright auger assembly 36. The lower edge of the shell 68 has three openings 71 in registration with the auger flights 47 so that silage conveyed by the rotating auger flights 47 is moved into the throat area 69 through the openings 71.

In order to retain the silage in the throat area 69 a horizontal plate 72 is secured to each angle beam 64 and the casing 49 to form separate platforms for the silage in the throat 69. The plate 72 extends closely adjacent a ribbed or fluted rubber sleeve 73 positioned about each auger shaft 46. As shown in FIG. 5 the sleeve 73 is secured to the section of the auger shaft 46 in the throat area 69 and rotates in a direction to move the silage onto the top of the plate 72.

As shown in FIG. 3, the lower end of the drive shaft 39 extends through the bottom end wall 56 of the casing 49 and carries a collar 74. Secured to the collar 74 are a plurality of auger flights 76, 77 and 78 which curve upwardly in a spiral pattern around the cylindrical casing 49 and terminate adjacent the fluted sleeves 73. The spiral flights 76, 77 and 78 constitute the lower section of the upright auger assembly 36 and form a screw assembly which functions to move silage in an upward direction around the outside of the casing 49 into the throat area 69.

The upper section of the auger assembly 36 comprises a cup-shaped housing 79 which is positioned over the upper part of the casing 49 and is secured to the shaft 39 by a bolt 81. A plurality of auger flights 82 and 83 are secured at their inner peripheries to the housing 79 and extend upwardly in a spiral manner so as to elevate the silage moved into the throat area 69 by the auger flights 47. The silage elevated out of the throat area 69 by the auger flights 82 and 83 is carried by the lateral conveyer 37 through the doorway 24 into the silo discharge chute 26.

Figure 6:
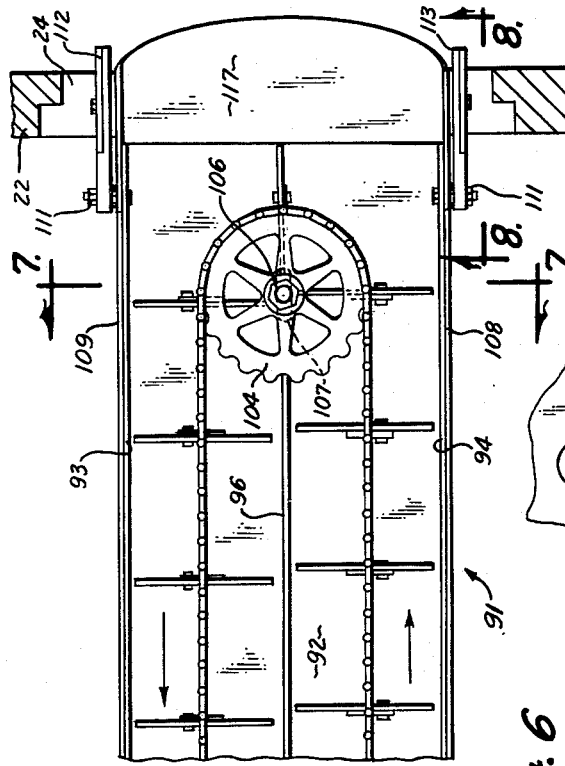
FIG. 6 is an enlarged plan view of the lateral silage conveyer on the silage unloader of FIG. 1.

The lateral conveyer 37 comprises a housing 84 extended in an upward direction and connected to the worm and worm gear assembly 41 by a plurality of arms 86 (FIG. 1). The lower section 87 of the housing 84 has a cylindrical shape and is positioned concentrically about the top section of the shell 68. Above the lower section 87 the housing 84 has a lateral spout 88 which extends toward the doorway 24. As shown in FIG. 6, the spout 88 is divided by an upright plate 89 extended into a contiguous relationship with the shaft 39.

A pan 91 having a base wall 92 and upright side walls 93 and 94 and a longitudinally extended rib 96 secured to the mid-section of the base wall 92 projects from the spout 88 of the housing 84 to the doorway 24. As shown in FIG. 6, the side walls 93 and 94 of the pan are positioned adjacent the walls of the housing 84 so that the rib 96 overlaps the plate 89. A pin 97 extends transversely through the overlapped portions of the pan and side walls to pivotally mount the pan on the housing spout 88.

The silage is carried along the base wall 92 of the pan by an endless chain 98 having longitudinally spaced hands 99 extended transversely of the chain and downwardly into the pan 91. Each hand 99 is carried on a downwardly projected arm 101 that extends from a selected link in the chain 98 and is secured to such arm by bolt assembly 102.

As shown in FIG. 6, one end portion of the chain 98 is in driven engagement with a sprocket 103 mounted on the shaft 39. As shown in FIG. 3, the chain 98 engages the pin 97 so as to maintain the chain 98 in alignment with the sprocket 103. The opposite end portion of the chain 98 is trained about an idler sprocket 104 which is rotatably mounted in a horizontal position on the base wall 92 by a nut and bolt assembly 106. The nut and bolt assembly 106 projects through a longitudinal slot 107 in the base wall 92 and is adapted to be longitudinally adjusted to vary the tension on the chain 98.

Figure 8:
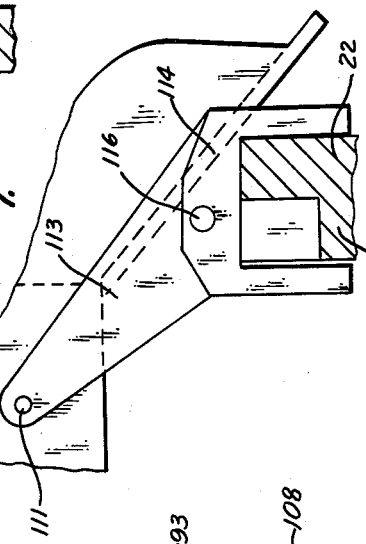
FIG. 8 is an enlarged sectional view taken along the line 8—8 of FIG. 6.
Figure 7:
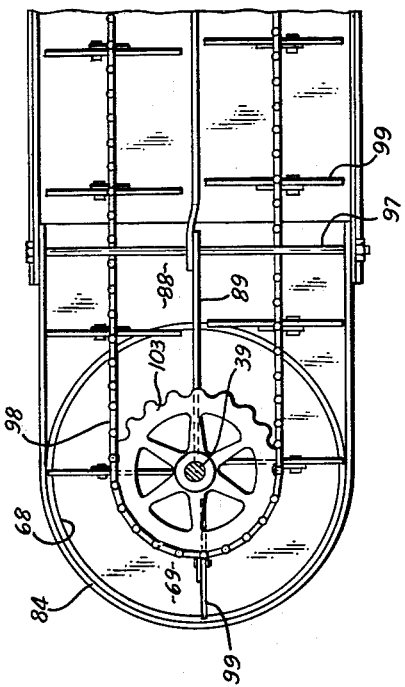
FIG. 7 is an enlarged sectional view taken along the line 7—7 of FIG. 6.

As shown in FIG. 7, the pan 91 is reinforced by a pair of angle beams 108 and 109 extended longitudinally of the pan 91 and secured to the side walls 93 and 94 and base wall 92. Pivotally mounted on the outer ends of the angle beams 108 and 109 by bolt and nut assemblies 111 are a pair of arms 112 and 113 which extend to the doorway 24. A U-shaped clamp 114 is pivotally mounted to the end of each arm 112 and 113 by a nut and bolt assembly 116. As shown in FIG. 8 the U-shaped clamp 114 extends over the sill section 115 of the silo wall 22 so as to maintain the lateral conveyer 37 in alignment with the doorway 24. A U-shaped slide 117, pivotally mounted on the outer end of the pan 91, extends downwardly and outwardly and functions as a guide to direct the silage into the silo chute 26.

Figure 11:
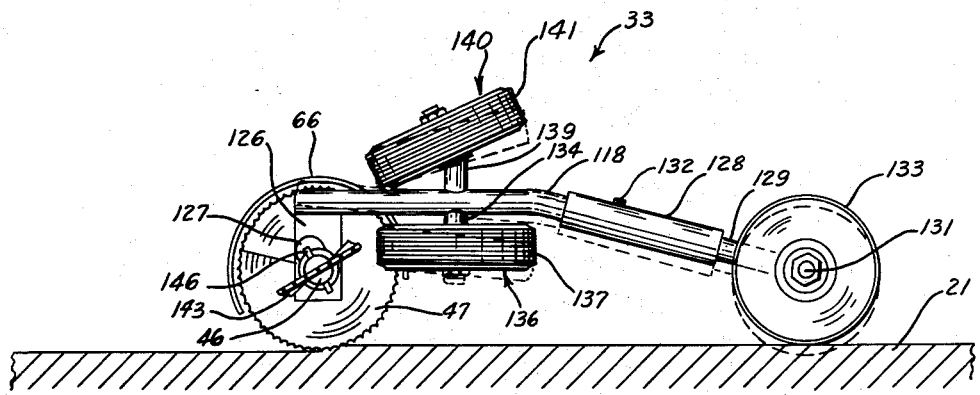
FIG. 11 is an elevation view of the assembly of FIG. 10.

As shown in FIGS. 10 and 11, each wheel assembly 33 has a frame 118 which lies in a plane transversely of the auger shaft 46 and projects in a forward direction. The forward section of the frame 118 extends downwardly and toward the center area of the silo. The frame 118 is rotatably mounted on the end of the angle beam 64 on axis which is substantially parallel to the auger shaft 46. A tubular member 119 is secured to the end of the angle beam 64. A rod 121, slidably positioned in the tubular member 119, is secured at its outer end to the frame 118.

The rod 121 and frame 118 are biased toward the silo wall 22 by a compression spring 122 positioned about the rod 121 with the inner end of the spring in engagement with the tubular member 119 and its outer end in engagement with an adjustable stop nut 123 threaded on the rod 121. The outward movement of the frame 118 and rod 121 is limited by a pin 124 which extends transversely through the inner end of the rod 121 and engages the tubular member 119. The rear or trailing end of the frame 118 is positioned above the auger shaft 46 and has secured thereto a U-shaped strap 126 which projects in a downward direction. As shown in FIG. 11, the strap 126 has an arcuate slot 127 which extends upwardly and rearwardly. The auger shaft 46 projects through the slot 127 and coacts with the slot to limit the rotational movement of the frame 118 about the axis of the rod 121.

The forward section of the frame 118 projects in a downward and inward direction and has secured thereto a sleeve 128. A strut 129 having a right angle stub shaft 131 extends into the sleeve 128 and is retained therein in adjusted position by a set screw 132. A gauge wheel 133 is rotatably mounted on the stub shaft 131 and is in engagement with the top surface of the silage 21.

Figure 12:
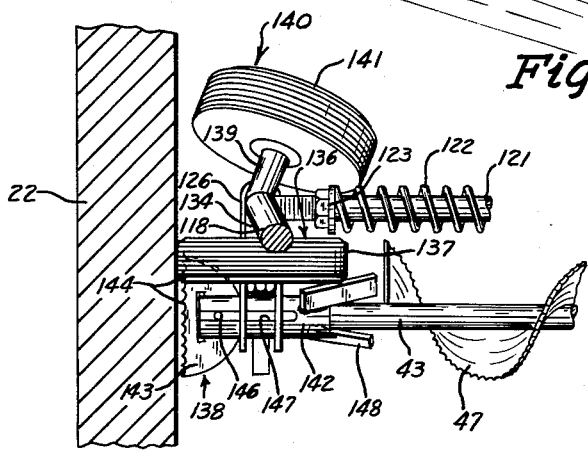
FIG. 12 is a sectional view taken along the line 12—12 of FIG. 10.

As shown in FIGS. 11 and 12, an axle 134 is secured to the bottom of the frame 118 and extends in a downward direction substantially parallel to the silo side wall 22. A wheel 136 having a pneumatic tire 137 is rotatably mounted on the axle 134. The tire 137 is normally biased by the spring 122 into engagement with the silo side wall 22 and rotates in a horizontal plane so as to maintain the auger of a collector unit in engagement with the silage 21 and to space the chipper unit 138 from the side wall 22.

Referring to FIG. 11, when the gauge wheel 133 moves into a depression or hole in the silage 21 the frame 118 will pivot about the axis of the rod 121 tilting the forward or trailing side of the wheel 136 toward the silage 21, as shown by the broken lines. The tire 137 being in engagement with the silo side wall 22 will tend to move the collector unit in a downward direction so as to keep the auger flight 47 in continuous engagement with the silage 21. When the gauge wheel 133 is raised the guide wheel 136 will be tilted in an opposite direction and thus coacts with the side wall 22 to raise the auger flight 47.

The wheel assembly also includes a second axle 139 which is secured to the frame 118 above the axle 134. As shown in FIGS. 11 and 12, the axle 139 extends upwardly and rearwardly and as shown in FIG. 12, terminates in an upper section which extends radially inwardly. A wheel 140 having a pneumatic tire 141 is rotatably mounted on the upper section of the axle 139. As shown in FIG. 12, a tire 141 is normally spaced from the side wall 22, when the collector units are in their lever position and functions to maintain the silage unloader in a substantially level position.

Each collector unit includes a chipper unit 138 that comprises a sleeve 142 slidably positioned on the outer end of an auger shaft 46. The sleeve 142 extends through the arcuate slot 127 in the strap 126 and terminates adjacent the side wall 22 and is drivably coupled to the auger shaft 46 by a pin 146 which extends through axial slots 147 in the sleeve 142 and through the end of the auger shaft 46. The pin and slot connection between the sleeve 142 and the auger shaft 46 permits the chipper unit 138 to move axially of the auger shaft 46 under the influence of the compression spring 122. A curved blade 143 having teeth 144 is secured to the outer end of the sleeve 142.

As shown in FIG. 10, a chipper unit 138 has a plurality of plates 148 which extend radially inwardly and slope in a helical direction. The plates 148 are secured to the inner end section of the sleeve 142 and rotate with the sleeve 142 and function to move the silage in a radially inward direction into the path of an auger flight 47. A radially projected finger 150 secured to the sleeve 142 moves the silage from under the frame 118 into the path of the plates 148.

In use, the silo unloader 28 is operated by connecting the electric motor 42 to the electric power source. The motor 42 drives the worm and worm gear assembly 41 which in turn rotates the upright shaft 39. As shown in FIG. 4, the shaft 39 rotates the bevel drive gear 59 which is in driving engagement with the bevel gears 61, 62 and 63 mounted on the inner ends of the auger shafts 46. The bevel drive gear 59 simultaneously rotates the shafts 46 of the augers 43, 44 and 45 and produces a torque which moves or walks the collector units 29, 31 and 32 around the silo in the direction of the arrow A shown in FIG. 1.

Each auger shaft 46 has a chipper unit 138 mounted on its outer end. The chipper unit 138 is rotated by the shaft 46 and functions to remove silage from the area immediately adjacent the silo wall into the path of the rotating auger flight 47. The flights 47 of each auger engage the top surface of the stored silage and function to loosen and carry silage toward the center area of the silo. The cover 66 which encloses the back and top sections of the auger flight 47 provides a guideway for the silage as it is moved toward the center area of the silo and functions as a scraper as the collector unit walks around the silo.

As shown in FIG. 3, the auger flight 47 moves the silage through an opening 71 in the circular shell 68 into the throat area 69 and into the side of the upright auger assembly 36. The silage in the throat area 69 is moved in an upward direction by the action of the rib sleeve 73 and the auger flights 76, 77 and 78 which are connected to the bottom of the shaft 39 and the auger flights 82 and 83 which are drivably connected to the mid-section of the shaft 39. The upper auger flights 82 and 83 move the silage into the path of the hands 99 of the lateral conveyer 37.

As shown in FIG. 6 the hands 99 move the silage along the pan 91 depositing silage on the U-shaped slide 117 which directs silage into the chute 26.

The wheel assembly 33 mounted on the outer end of each collector unit 29, 31 and 32 functions to maintain the unloader 28 in a substantially level position and the respective collector units in operative engagement with the top surface of the silage 21. As shown in FIG. 13, should the outer end of a collector unit move downwardly out of its normal level or operating position the wheel 140 contacts the silo side wall 22 concurrently with movement of the guide wheel 136 out of engagement with the silo side wall 22. The compression spring 122 biases the wheel 140 toward the wall 22. The angular position of the wheel 140 on a collector unit is such that the wheel 140 advances upwardly on the wall 22 thereby carrying the collector unit back to a level position. When the level position is reached the guide wheel 136 is returned into engagement with the silo wall 22 and the leveling wheel 140 moves out of engagement with the wall 22, as shown in FIG. 12.

The gauge wheel 133 follows the contour of the top surface of the silage 21 as it moves around the silo. When the wheel 133 drops into a depression or rides over a projection on the top surface of the stored silage the frame 118 pivots about the axis of the rod 121 changing the angular position of the guide wheel 136 as shown in broken lines in FIG. 11. In the event the wheel 133 drops into a depression the tire 137, being in engagement with the silo side wall 22 tends to move a collector unit downwardly whereby to return the frame 118 to a level position. In the event the wheel 133 rolls onto a projection in the top surface of the silage, the tire 133 coacts with the silo side wall 22 to raise the collector unit.

The normal plane of rotation of the wheel 136 may be varied by adjusting the length of the strut 129 relative to the sleeve 128. The plane of rotation of the wheel 136 may be changed to an upward direction or a downward direction to vary the digging effect of the augers of the respective collector units 29, 31 and 32.

Figure 14:
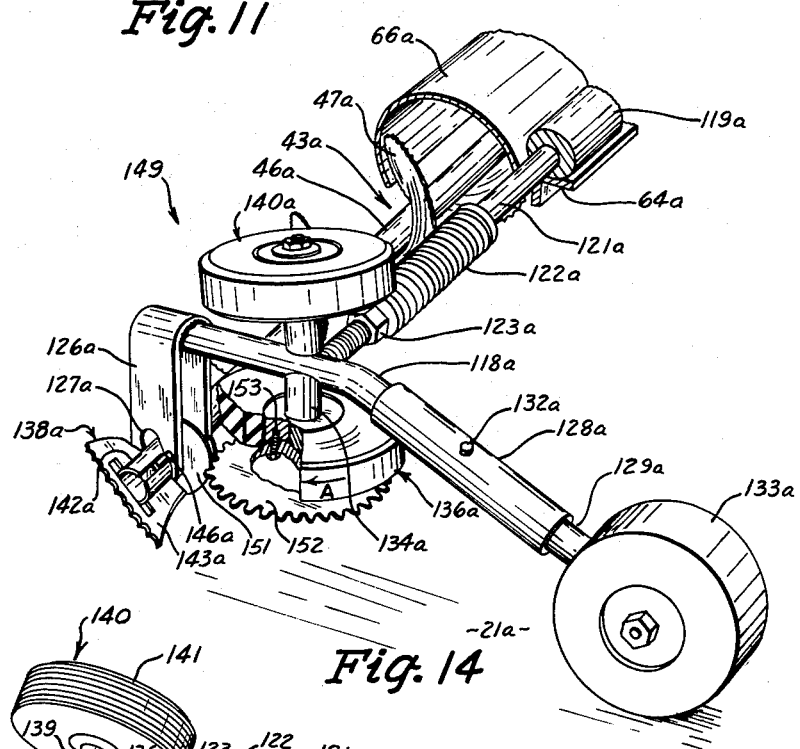
FIG. 14 is a perspective view of a modified chipper and wheel assembly.

A modified wheel assembly 149 is shown in FIG. 14. The wheel assembly 149 is similar in construction to the wheel assembly 33 with a corresponding structure identified with the suffix *a*. The wheel assembly 149 has a guide wheel 136a normally in engagement with the silo side wall. The wheel 136a is power driven so as to supplement the walking action of the collector unit. A worm 151 is mounted on the chipper unit sleeve 142a between the legs of the strap 126a. A worm gear 152 is secured to the hub of the guide wheel 136a by bolts 153 and is in a driving relation with the worm 151. Rotation of the auger shaft 46a drives the worm 151 which in turn rotates the worm gear 152 turning the guide wheel 136a in the direction of the arrow A.

In summary, the silo unloader 28 has a plurality of radially extended collector units 29, 31 and 32 which function to conjointly move silage toward the center area of the silo and walk around the silo. An upright auger assembly 36 receives the silage from the collector units moving the silage in an upward direction into a lateral conveyor 37 which transports the silage to the chute 26.

The silo unloader 28 is maintained in continuous engagement with the silage and in a substantially level position by wheel assembly 33 mounted on the outer end of each collector unit. Each wheel assembly 33 is pivotally mounted on the angle beam 67 and has a gauge wheel 133 which follows the contour of the top surface of the silage and a guide wheel 136 in engagement with the side wall. The plane of rotation of the guide wheel 136 is controlled by the position of the gauge wheel 133. The gauge wheel 133 and guide wheel 136 cooperate to maintain the collector unit in continuous engagement with the silage.

The third wheel 140 of the wheel assembly 33 engages the silo side wall when the outer end of the collector unit falls below a level position. The wheel 140 rotates in an upwardly extended plane carrying the collector unit to a level position.

While there have been shown, described, and pointed out the fundamental novel features of the invention, it is to be understood that various omissions, substitutions, changes in form, and details of the apparatus illustrated may be made by those skilled in the art, without departing from the spirit of the invention. It is intended to be limited only as indicated by the scope of the following claims.

I claim:

1. A bulk material handling apparatus for use in a silo having a side wall with a discharge opening section comprising:
   (a) an upright drive shaft positioned in the silo above the bulk material stored therein,
   (b) a power unit operably connected to said drive shaft for rotating the same,
   (c) laterally disposed collector means for collecting the top surface of the bulk material stored in the silo and carrying said top surface material to the center area of the silo,
   (d) gear means connecting the collector means with the drive shaft and operable to rotate the collector means to effect movement of bulk materail radially inward and to walk the collector means around the silo,
   (e) housing means rotatably mounted on said drive shaft and enclosing said gear means, and
   (f) auger means connected to said drive shaft and positioned concentrically about said housing means whereby the bulk material carried by said collector means is fed into the side of the auger means and moved in an upward direction by said auger means.

2. The bulk material handling apparatus defined in claim 1 including:
   (a) shell means mounted on said collector means and movable therewith about said auger means, whereby a bulk material receiving throat area is formed between said housing means and said shell means, and
   (b) conveyer means connected to said drive shaft and operable to move the bulk material from the throat area of said housing means to the silo discharge opening section.

3. A bulk material handling apparatus for use in a silo having a discharge opening section comprising:
   (a) an upright drive shaft positioned in the center area of the silo above the bulk material stored therein,
   (b) a power unit operably connected to said drive shaft for rotating the same,
   (c) collector means in engagement with the top surface of the bulk material in the silo and operative to move the same to the center area of the silo,
   (d) power transmission means connecting the collector means with the drive shaft whereby upon rotation of said drive shaft the collector means simultaneously rotates about its longitudinal axis and about the axis of the drive shaft,
   (e) housing means mounted about said power transmisssion means, said housing means rotatably connected to said drive shaft and movable with said collector means about the axis of the drive shaft, and
   (f) auger means connected to the drive shaft and extended in an upward direction around said housing means, said auger means having first and second sections extended above and below said collector means, respectively, whereby the bulk material carried by said collector means is fed into the side of the auger means and moved in an upward direction.

4. The bulk material handling apparatus defined in claim 3, including:
   (a) feed members secured to said collector means and positioned between said first and second sections of said auger means, and
   (b) plate members secured to said collector means and positioned adjacent said feed members whereby bulk material moved into said auger means is moved upwardly from said second section by said feed members onto said plate members to be further moved upwardly by said first section.

5. In a bulk material handling apparatus:
   (a) an upright drive shaft,
   (b) a plurality of first auger means extended laterally of said drive shaft,
   (c) power transmission means connecting said first auger means with said drive shaft whereby upon rotation of said drive shaft the first auger means is rotated about the longitudinal axis thereof and about the axis of the drive shaft,
   (d) housing means rotatably mounted on said drive shaft and enclosing said power transmission means,
   (e) shell means secured to said auger means and extended in a concentrically spaced relation about said housing means to form a bulk material receiving throat area therebetween, and
   (f) second auger means secured to said drive shaft and extended circumferentially about said housing means within said throat area.

References Cited by the Examiner

UNITED STATES PATENTS

| | | |
|---|---|---|
| 2,678,241 | 5/1954 | Miller. |
| 2,794,560 | 6/1957 | Buschbom _____ 214—17 |
| 2,988,238 | 6/1961 | Bruecker _____ 214—17 |
| 2,998,123 | 8/1961 | Kooiker et al. _____ 198—213 |
| 3,013,674 | 12/1961 | Patz et al. _____ 214—17 |
| 3,019,005 | 1/1962 | Van Dusen _____ 262—19 |
| 3,023,917 | 3/1962 | Patz et al. _____ 214—17 |
| 3,050,294 | 8/1962 | Patz et al. _____ 262—19 |
| 3,079,016 | 2/1963 | Dretzke _____ 214—17.84 |
| 3,155,247 | 11/1964 | Patterson. |

GERALD M. FORLENZA, *Primary Examiner.*

HUGO O. SCHULZ, *Examiner.*